(12) United States Patent
Seong et al.

(10) Patent No.: US 11,198,370 B2
(45) Date of Patent: Dec. 14, 2021

(54) POSITION MEASUREMENT APPARATUS AND METHOD FOR WIRELESS POWER TRANSFER

(71) Applicants: HYUNDAI MOTOR COMPANY, Seoul (KR); KIA MOTORS CORPORATION, Seoul (KR); HYUNDAI AUTOEVER CORP., Seoul (KR)

(72) Inventors: Jae Yong Seong, Hwaseong-si (KR); Kyung Taek Kim, Anyang-si (KR)

(73) Assignees: HYUNDAI MOTOR COMPANY, Seoul (KR); KIA MOTORS CORPORATION, Seoul (KR); HYUNDAI AUTOEVER CORP., Seoul (KR)

( * ) Notice: Subject to any disclaimer, the term of this patent is extended or adjusted under 35 U.S.C. 154(b) by 81 days.

(21) Appl. No.: 16/695,756

(22) Filed: Nov. 26, 2019

(65) Prior Publication Data

US 2020/0164754 A1    May 28, 2020

(30) Foreign Application Priority Data

Nov. 28, 2018 (KR) .......................... 10-2018-0149174
Nov. 22, 2019 (KR) .......................... 10-2019-0151120

(51) Int. Cl.
| | |
|---|---|
| *B60L 53/126* | (2019.01) |
| *H02J 50/90* | (2016.01) |
| *H02J 50/80* | (2016.01) |
| *H02J 50/12* | (2016.01) |

(Continued)

(52) U.S. Cl.
CPC ............. *B60L 53/126* (2019.02); *B60L 53/60* (2019.02); *H02J 50/12* (2016.02); *H02J 50/80* (2016.02); *H02J 50/90* (2016.02); *B60K 6/28* (2013.01); *B60Y 2200/91* (2013.01); *B60Y 2200/92* (2013.01); *B60Y 2300/91* (2013.01)

(58) Field of Classification Search
CPC ........ B60L 53/126; B60L 53/60; H02J 50/80; H02J 50/90; H02J 50/12; B60K 6/28; B60Y 2200/91; B60Y 2200/92
USPC ....................................................... 320/108
See application file for complete search history.

(56) References Cited

U.S. PATENT DOCUMENTS

| | | | |
|---|---|---|---|
| 10,040,360 B1 * | 8/2018 | Long ................. | H02J 7/025 |
| 11,021,074 B2 * | 6/2021 | Moghe ................ | G06N 20/00 |
| 11,059,379 B2 * | 7/2021 | Seong ................ | H02J 50/12 |

(Continued)

FOREIGN PATENT DOCUMENTS

| | | | | |
|---|---|---|---|---|
| EP | 3643555 A1 * | 4/2020 | ............... | G07C 5/08 |
| WO | WO-2019039633 A1 * | 2/2019 | ............. | H02J 50/10 |

*Primary Examiner* — Suresh Memula
(74) *Attorney, Agent, or Firm* — McDonnell Boehnen Hulbert & Berghoff LLP

(57) ABSTRACT

A position measurement method for position alignment with a vehicle, performed by a charging pad, may comprise performing synchronization with a vehicle entering a vicinity of the charging pad, transmitting low frequency (LF) signals having a same strength through a plurality of LF spots of the charging pad, receiving information on reception strengths of the LF signals from the vehicle, adjusting a transmission strength for the plurality of LF spots according to the information on reception strengths received from the vehicle, and transmitting the LF signals according to the adjusted transmission strength.

16 Claims, 12 Drawing Sheets

(51) Int. Cl.
*B60L 53/60* (2019.01)
*B60K 6/28* (2007.10)

(56) References Cited

U.S. PATENT DOCUMENTS

| | | | |
|---|---|---|---|
| 2014/0340027 A1* | 11/2014 | Keeling | H02M 7/00 |
| | | | 320/108 |
| 2017/0005523 A1* | 1/2017 | Widmer | B60L 53/36 |
| 2017/0111088 A1* | 4/2017 | Seong | H02J 50/10 |
| 2017/0225582 A1* | 8/2017 | Augst | B60L 53/38 |
| 2017/0361726 A1* | 12/2017 | Widmer | G01S 19/42 |
| 2018/0111492 A1* | 4/2018 | McCool | B60L 53/12 |
| 2018/0244168 A1* | 8/2018 | Peer | B60L 53/60 |
| 2018/0262059 A1* | 9/2018 | Apostolos | H02J 50/27 |
| 2018/0312071 A1* | 11/2018 | Long | H02J 50/12 |
| 2020/0079237 A1* | 3/2020 | Seong | B60L 53/126 |
| 2020/0127506 A1* | 4/2020 | McMahon | B60L 53/122 |
| 2020/0136439 A1* | 4/2020 | Seong | B60L 53/38 |
| 2021/0061117 A1* | 3/2021 | Singuru | B60L 53/36 |
| 2021/0124078 A1* | 4/2021 | Widmer | H02J 50/90 |
| 2021/0221244 A1* | 7/2021 | Kuhr | B60L 53/38 |

* cited by examiner

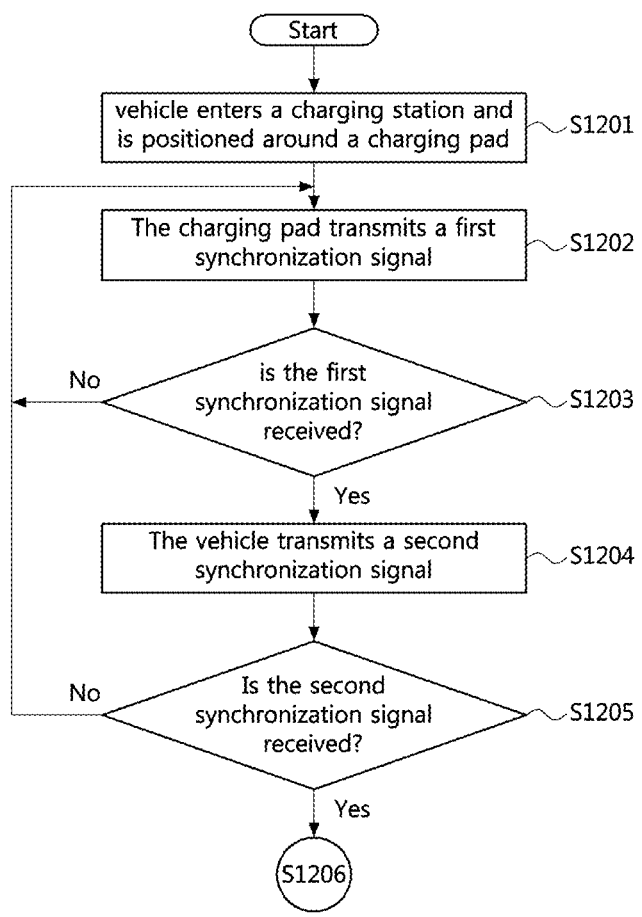

POSITION MEASUREMENT APPARATUS AND METHOD FOR WIRELESS POWER TRANSFER

CROSS-REFERENCES TO RELATED APPLICATIONS

This application claims the benefit of priority to Korean Patent Application No. 10-2018-0149174, filed on Nov. 28, 2018, and Korean Patent Application No. 10-2019-0151120, filed on Nov. 22, 2019, the entire contents of which are incorporated herein by reference.

TECHNICAL FIELD

The present disclosure relates to a position measurement method for wires power transfer and a position measurement apparatus using the same, and more specifically, to a position measurement method based on low frequency (LF) signals and a position measurement apparatus using the same.

BACKGROUND

An electric vehicle (EV) drives an electric motor by a power of a battery, and has less air pollution sources such as exhaust gas and noise compared with a conventional gasoline engine vehicle, fewer faults, a long life span, and, advantageously, the operation of the EV is simplified.

The EVs are classified into hybrid electric vehicles (HEVs), plug-in hybrid electric vehicles (PHEVs), and electric vehicles (EVs), based on a driving source. The HEV has an engine as a main power and a motor as an auxiliary power. The PHEV has a main power motor and an engine used when a battery is discharged. The EV has a motor, but the EV does not have an engine.

The wireless charging of the battery for driving the electric motor of the EV may be performed by coupling a primary coil of a charging station with a secondary coil of the EV in a magnetic resonance manner. Additionally, in a magnetic resonance wireless power transfer (WPT) system, if the primary and secondary coils are not aligned, the efficiency of the WPT may be reduced substantially. Therefore, the alignment of the primary coils and the secondary coils is required.

As a conventional alignment scheme, a technique has been developed of aligning an EV equipped with a secondary coil to a primary coil of a ground assembly (GA) using a rear camera. Another developed technique teaches moving a movable charging pad after an EV is parked in a parking area by a bump to align a primary coil of the charging pad with a secondary coil of the EV.

However, such conventional techniques may cause user's intervention in the alignment of the coils, inconvenience due to the user's intervention, and a substantial deviation of the alignment, which may lead to excessive system performance deterioration due to slight coil misalignment. Therefore, in the magnetic resonance WPT system sensitive to the misalignment of the coils, the optimum power transfer efficiency is difficult to realize, and the stability and reliability of the system is reduced.

Accordingly, there is a need for a method of more accurately measuring or estimating the position of the vehicle for alignment between the ground assembly of charging station and the vehicle assembly of electric vehicle in the WPT system.

SUMMARY

The present disclosure provides a position measurement method for position alignment in wireless power transfer, which uses low frequency (LF) signals. Additionally, the present disclosure provides a position alignment apparatus using the position measurement method.

According to exemplary embodiments of the present disclosure, a position measurement method for position alignment with a vehicle, performed by a charging pad, may comprise performing synchronization with a vehicle entering a vicinity of the charging pad; transmitting low frequency (LF) signals having a same strength through a plurality of LF spots of the charging pad; receiving information on reception strengths of the LF signals from the vehicle; adjusting a transmission strength for the plurality of LF spots according to the information on reception strengths received from the vehicle; and transmitting the LF signals according to the adjusted transmission strength.

The position measurement method may further comprise determining whether the adjusted transmission strength falls within an alignment range between the vehicle and the charging pad, wherein the adjusting of the transmission strength and the transmitting of the LF signals are repeated until the adjusted transmission strength is determined to fall within the alignment range.

The performing of the synchronization may further comprise transmitting a first synchronization signal to the vehicle through the plurality of LF spots of the charging pad; and detecting a second synchronization signal transmitted by the vehicle.

The adjusting of the transmission strength may further comprise reducing the transmission strength for the plurality of LF spots when the reception strengths of the LF signals informed from the vehicle are increased as compared to previous reception strengths.

In the adjusting of the transmission strength, the LF signals may be transmitted by the plurality of LF spots at different time points, respectively.

The determining of whether the adjusted transmission strength falls within the alignment range may further comprise defining a charging pad region having vertexes corresponding positions of the plurality of LF spots of the charging pad; and performing the determining using the defined charging pad region and the reception strengths at a plurality of LF spots of the vehicle.

The determining of whether the adjusted transmission intensity falls within the alignment range further comprises configuring a plurality of circles each of which is centered at each vertex of the charging pad region and has a radius corresponding to each reception strength at a first LF spot of the vehicle; determining a point at which the plurality of circles intersect as a position of the first LF spot; and determining that the vehicle falls within the alignment range when the position of the first LF spot is within the charging pad region.

Each of the LF signals transmitted by the plurality of LF spots may include a preamble, an identifier of each LF spot, and position information of each LF spot.

Furthermore, according to exemplary embodiments of the present disclosure, a position measurement apparatus, for measuring a relative position between a vehicle and a charging pad, may comprise a processor and a memory storing at least one instruction executable by the processor. When the at least one instruction executed by the processor, the at least one instruction may configure the processor to perform synchronization with a vehicle entering a vicinity of the charging pad; transmit low frequency (LF) signals having a same strength through a plurality of LF spots of the charging pad; receive information on reception strengths of the LF signals from the vehicle; adjust a transmission strength for the plurality of LF spots according to the information on reception strengths received from the vehicle; and transmit the LF signals according to the adjusted transmission strength.

The at least one instruction may further configure the processor to determine whether the adjusted transmission strength falls within an alignment range between the vehicle and the charging pad, wherein the adjusting of the transmission strength and the transmitting of the LF signals are repeated until the adjusted transmission strength is determined to fall within the alignment range.

In the performing of the synchronization, the at least one instruction may further configure the processor to transmit a first synchronization signal to the vehicle through the plurality of LF spots of the charging pad; and detect a second synchronization signal transmitted by the vehicle.

In the adjusting of the transmission strength, the at least one instruction may further configure the processor to reduce the transmission strength for the plurality of LF spots when the reception strengths of the LF signals informed from the vehicle are increased as compared to previous reception strengths.

In the adjusting of the transmission strength, the LF signals may be transmitted by the plurality of LF spots at different time points, respectively.

In the determining of whether the adjusted transmission strength falls within the alignment range, the at least one instruction may further configure the processor to define a charging pad region having vertexes corresponding positions of the plurality of LF spots of the charging pad; and perform the determining using the defined charging pad region and the reception strengths at a plurality of LF spots of the vehicle.

In the determining of whether the adjusted transmission intensity falls within the alignment range, the at least one instruction may further configure the processor to configure a plurality of circles each of which is centered at each vertex of the charging pad region and has a radius corresponding to each reception strength at a first LF spot of the vehicle; determine a point at which the plurality of circles intersect as a position of the first LF spot; and determine that the vehicle falls within the alignment range when the position of the first LF spot is within the charging pad region.

Each of the LF signals transmitted by the plurality of LF spots may include a preamble, an identifier of each LF spot, and position information of each LF spot.

According to the exemplary embodiments of the present disclosure, by accurately measuring the position of the vehicle using the LF signals, the primary coil of the ground assembly and the secondary coil of the electric vehicle may be more accurately aligned, thereby maximizing wireless charging efficiency.

BRIEF DESCRIPTION OF DRAWINGS

The present disclosure will become more apparent by describing in detail exemplary embodiments of the present disclosure with reference to the accompanying drawings, in which:

FIGS. 12A and 12B are flowcharts illustrating a position measurement method according to an exemplary embodiment of the present disclosure;

Figure 1:
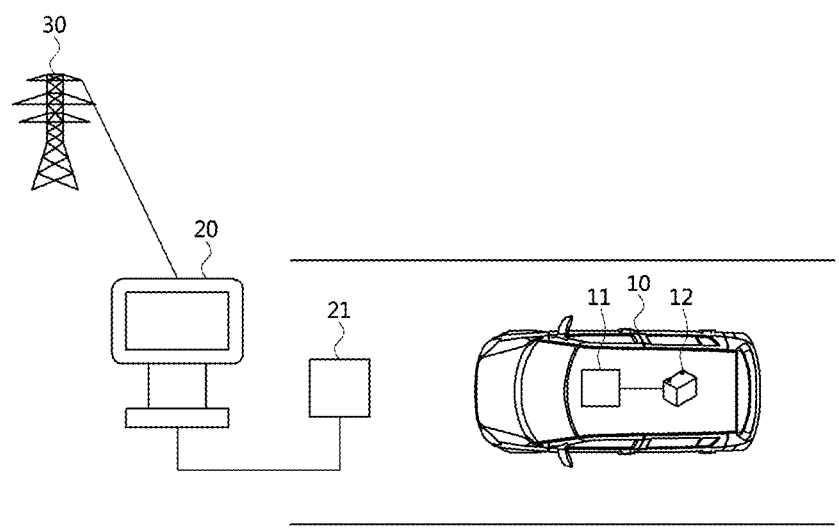
FIG. 1 is a conceptual diagram illustrating a concept of a wireless power transfer (WPT) to which exemplary embodiments of the present disclosure are applied.

It should be understood that the above-referenced drawings are not necessarily to scale, presenting a somewhat simplified representation of various features illustrative of the basic principles of the disclosure. The specific design features of the present disclosure, including, for example, specific dimensions, orientations, locations, and shapes, will be determined in part by the particular intended application and use environment.

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogenpowered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Exemplary embodiments of the present disclosure are disclosed herein. However, specific structural and functional details disclosed herein are merely representative for purposes of describing exemplary embodiments of the present disclosure; however, exemplary embodiments of the present disclosure may be embodied in many alternate forms and should not be construed as limited to exemplary embodiments of the present disclosure set forth herein. While describing the respective drawings, like reference numerals designate like elements.

It will be understood that although the terms "first," "second," etc. may be used herein to describe various components, these components should not be limited by these terms. These terms are used merely to distinguish one element from another. For example, without departing from the scope of the present disclosure, a first component may be designated as a second component, and similarly, the second component may be designated as the first component. The term "and/or" include any and all combinations of one of the associated listed items.

It will be understood that when a component is referred to as being "connected to" another component, the component may be directly or indirectly connected to the other component. In other words, for example, intervening components may be present. On the contrary, when a component is referred to as being "directly connected to" another component, there are no intervening components.

Terms are used herein only to describe the exemplary embodiments but not to limit the present disclosure. Singular expressions, unless defined otherwise in contexts, include plural expressions. In the present specification, terms of "comprise" or "have" are used to designate features, numbers, steps, operations, elements, components or combinations thereof disclosed in the specification as being present but not to exclude possibility of the existence or the addition of one or more other features, numbers, steps, operations, elements, components, or combinations thereof.

All terms including technical or scientific terms, unless being defined otherwise, have the same meaning generally understood by a person of ordinary skill in the art. Terms defined in dictionaries generally used are interpreted as including meanings identical to contextual meanings of the related art, unless definitely defined otherwise in the present specification, are not interpreted as being ideal or excessively formal meanings.

Additionally, one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, devices, or the like, as described herein.

Moreover, the below methods may be executed by an apparatus comprising the controller in conjunction with one or more other components, as would be appreciated by a person of ordinary skill in the art.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

According to exemplary embodiments of the present disclosure, an EV charging system may be defined as a system for charging a high-voltage battery mounted in an EV using power of an energy storage device or a power grid of a commercial power source. The EV charging system may have various forms according to the type of EV. For example, the EV charging system may be classified as a conductive-type using a charging cable or a non-contact wireless power transfer (WPT)-type (also referred to as an "inductive-type"). The power source may include a residential or public electrical service or a generator utilizing vehicle-mounted fuel, and the like.

Additional terms used in the present disclosure are defined as follows.

"Electric Vehicle (EV)": An automobile, as defined in 49 CFR 523.3, intended for highway use, powered by an electric motor that draws current from an on-vehicle energy storage device, such as a battery, which is rechargeable from an off-vehicle source, such as residential or public electric service or an on-vehicle fuel powered generator. The EV may be a four or more wheeled vehicle manufactured for use primarily on public streets or roads.

The EV may include an electric vehicle, an electric automobile, an electric road vehicle (ERV), a plug-in vehicle (PV), a plug-in vehicle (xEV), etc., and the xEV may be classified into a plug-in all-electric vehicle (BEV), a battery electric vehicle, a plug-in electric vehicle (PEV), a hybrid electric vehicle (HEV), a hybrid plug-in electric vehicle (HPEV), a plug-in hybrid electric vehicle (PHEV), etc.

"Plug-in Electric Vehicle (PEV)": An EV that recharges the on-vehicle primary battery by connecting to the power grid.

"Plug-in vehicle (PV)": An electric vehicle rechargeable via wireless charging from an electric vehicle supply equipment (EVSE) without using a physical plug or a physical socket.

"Heavy duty vehicle (H.D. Vehicle)": Any four- or more wheeled vehicle as defined in 49 CFR 523.6 or 49 CFR 37.3 (bus).

"Light duty plug-in electric vehicle": A three or four-wheeled vehicle propelled by an electric motor drawing current from a rechargeable storage battery or other energy devices for use primarily on public streets, roads and highways and rated at less than 4,545 kg gross vehicle weight.

"Wireless power charging system (WCS)": The system for wireless power transfer and control between the GA and VA including alignment and communications. This system transfers energy from the electric supply network to the electric vehicle electromagnetically via a two-part loosely coupled transformer.

"Wireless power transfer (WPT)": The transfer of electrical power from the alternating current (AC) supply network to the electric vehicle without contact.

"Utility": A set of systems which supply electrical energy and may include a customer information system (CIS), an advanced metering infrastructure (AMI), rates and revenue system, etc. The utility may provide the EV with energy based on a rates table and discrete events. Additionally, the utility may provide information about certification of EVs, interval of power consumption measurements, and a tariff.

"Smart charging": A system in which EVSE and/or PEV communicate with power grid to optimize charging ratio or discharging ratio of EV by reflecting capacity of the power grid or expense of use.

"Automatic charging": A procedure in which inductive charging is automatically performed after a vehicle is located in a proper position corresponding to a primary charger assembly that may transfer power. The automatic charging may be performed after obtaining necessary authentication and right.

"Interoperability": A state in which components of a system interwork with corresponding components of the system to perform operations aimed by the system. Additionally, information interoperability may refer to capability that two or more networks, systems, devices, applications, or components may efficiently share and easily use information without causing inconvenience to users.

"Inductive charging system": A system transferring energy from a power source to an EV via a two-part gapped core transformer in which the two halves of the transformer, i.e., primary and secondary coils, are physically separated from one another. In the present disclosure, the inductive charging system may correspond to an EV power transfer system.

"Inductive coupler": The transformer formed by the coil in the GA Coil and the coil in the VA Coil that allows power to be transferred with galvanic isolation.

"Inductive coupling": Magnetic coupling between two coils. In the present disclosure, coupling between the GA Coil and the VA Coil.

"Ground assembly (GA)": An assembly on the infrastructure side consisting of the GA Coil, a power/frequency conversion unit and GA controller as well as the wiring from the grid and between each unit, filtering circuits, at least one housing, etc., necessary to function as the power source of a wireless power charging system. The GA may include the communication elements necessary for communication between the GA and the VA.

"Vehicle assembly (VA)": An assembly on the vehicle consisting of the VA Coil, rectifier/power conversion unit and VA controller as well as the wiring to the vehicle batteries and between each unit, filtering circuits, at least one housing, etc., necessary to function as the vehicle part of a wireless power charging system. The VA may include the communication elements necessary for communication between the VA and the GA. The GA may be referred to as a supply device, and the VA may be referred to as an EV device.

"Supply device": An apparatus which provides the contactless coupling to the EV device. In other words, the supply device may be an apparatus external to an EV. When the EV is receiving power, the supply device may operate as the source of the power to be transferred. The supply device may include the housing and all covers.

"EV device": An apparatus mounted on the EV which provides the contactless coupling to the supply device. In other words, the EV device may be installed in the EV. When the EV is receiving power, the EV device may transfer the power from the primary battery to the EV. The EV device may include the housing and all covers.

"GA controller": The portion of the GA which regulates the output power level to the GA Coil based on information from the vehicle.

"VA controller": The portion of the VA that monitors specific on-vehicle parameters during charging and initiates communication with the GA to control an output power level. The GA controller may be referred to as a supply power circuit (SPC), and the VA controller may be referred to as an electric vehicle (EV) power circuit (EVPC).

"Magnetic gap": The vertical distance between the plane of the higher of the top of the litz wire or the top of the magnetic material in the GA Coil to the plane of the lower of the bottom of the litz wire or the magnetic material in the VA Coil when aligned.

"Ambient temperature": The ground-level temperature of the air measured at the subsystem under consideration and not in direct sun light.

"Vehicle ground clearance": The vertical distance between the ground surface and the lowest part of the vehicle floor pan.

"Vehicle magnetic ground clearance": The vertical distance between the plane of the lower of the bottom of the litz wire or the magnetic material in the VA Coil mounted on a vehicle to the ground surface.

"VA coil magnetic surface distance": the distance between the plane of the nearest magnetic or conducting component surface to the lower exterior surface of the VA coil when mounted. This distance includes any protective coverings and additional items that may be packaged in the VA coil enclosure. The VA coil may be referred to as a secondary coil, a vehicle coil, or a receive coil. Similarly, the GA coil may be referred to as a primary coil, or a transmit coil.

"Exposed conductive component": A conductive component of electrical equipment (e.g., an electric vehicle) that may be touched and which is not normally energized but which may become energized when a fault occurs.

"Hazardous live component": A live component, which under certain conditions may generate a harmful electric shock.

"Live component": Any conductor or conductive component intended to be electrically energized in normal use.

"Direct contact": Contact of persons with live components. (See, IEC 61440.)

"Indirect contact": Contact of persons with exposed, conductive, and energized components made live by an insulation failure. (See, IEC 61140.)

"Alignment": A process of finding the relative position of supply device to EV device and/or finding the relative position of EV device to supply device for the efficient power transfer that is specified. In the present disclosure, the alignment may direct to a fine positioning of the wireless power transfer system.

"Pairing": A process by which a vehicle is correlated with a dedicated supply device, at which the vehicle is located and from which the power will be transferred. Pairing may include the process by which a VA controller and a GA controller of a charging spot are correlated. The correlation/association process may include the process of association of a relationship between two peer communication entities.

"High-level communication (HLC)": HLC is a special type of digital communication. HLC is necessary for additional services which are not covered by command and control communication. The data link of the HLC may use a power line communication (PLC), but the data link of the HLC is not limited to the PLC.

"Low-power excitation (LPE)": LPE refers to a technique of activating the supply device for the fine positioning and pairing so that the EV may detect the supply device, and vice versa.

"Service set identifier (SSID)": SSID is a unique identifier consisting of 32-characters attached to a header of a packet transmitted on a wireless LAN. The SSID identifies the basic service set (BSS) to which the wireless device attempts to connect. The SSID distinguishes multiple wireless LANs. Therefore, all access points (APs) and all terminal/station devices that want to use a specific wireless LAN may use the same SSID. Devices that do not use a unique SSID are not able to join the BSS. Since the SSID is shown as plain text, the SSID may not provide any security features to the network.

"Extended service set identifier (ESSID)": ESSID is the name of the network to which one desires to connect. ESSID is similar to SSID but a more extended concept.

"Basic service set identifier (BSSID)": BSSID consisting of 48 bits is used to distinguish a specific BSS. With an infrastructure BSS network, the BSSID may be configured for medium access control (MAC) of the AP equipment. For an independent BSS or ad hoc network, the BSSID may be generated with any value.

The charging station may include at least one GA and at least one GA controller configured to manage the at least one GA. The GA may include at least one wireless communication device. The charging station may refer to a place or location having at least one GA, which is installed in home, office, public place, road, parking area, etc. According to exemplary embodiments of the present disclosure, "rapid charging" may refer to a method of directly converting AC power of a power system to direct current (DC) power, and supplying the converted DC power to a battery mounted on an EV. In particular, a voltage of the DC power may be DC 500 volts (V) or less.

According to exemplary embodiments of the present disclosure, "slow charging" may refer to a method of charging a battery mounted on an EV using AC power supplied to a general home or workplace. An outlet in each home or workplace, or an outlet disposed in a charging stand may provide the AC power, and a voltage of the AC power may be AC 220V or less. The EV may further include an on-board charger (OBC) configured to boost the AC power for the slow charging, convert the AC power to DC power, and supply the converted DC power to the battery.

According to exemplary embodiments of the present disclosure, a frequency tuning may be used for performance optimization. In particular, the frequency tuning may be performed by a supply device and may not be performed by an EV device. Additionally, all the supply devices may be required to provide the frequency tuning over a full range. An electric vehicle power controller (EVPC) may be configured to operate in a frequency range between about 81.38 kHz and 90.00 kHz. A nominal frequency (hereinafter, referred to as a target frequency, a design frequency, or a resonance frequency) for the magnetic field wireless power transfer (MF-WPT) may be about 85 kHz. The power supply circuits may provide the frequency tuning.

Hereinafter, exemplary embodiments of the present disclosure will be explained in detail by referring to accompanying figures.

FIG. 1 is a conceptual diagram illustrating a concept of a wireless power transfer (WPT) to which exemplary embodiments of the present disclosure are applied.

As shown in FIG. 1, a WPT may be performed by at least one component of an electric vehicle (EV) 10 and a charging station 20, and may be used for wirelessly transferring power to the EV 10. In particular, the EV 10 may be usually defined as a vehicle supplying an electric power stored in a rechargeable energy storage including a battery 12 as an energy source of an electric motor which is a power train system of the EV 10.

However, the EV 10 according to exemplary embodiments of the present disclosure may include a hybrid electric vehicle (HEV) having an electric motor and an internal combustion engine together, and may include an automobile and also a motorcycle, a cart, a scooter, and an electric bicycle. Additionally, the EV 10 may include a power reception pad 11 including a reception coil for charging the battery 12 wirelessly and may include a plug connection for conductively charging the battery 12. In particular, the EV 10 configured for conductively charging the battery 12 may be referred to as a plug-in electric vehicle (PEV).

Particularly, the charging station 20 may be connected to a power grid 30 or a power backbone, and provides an alternating current (AC) power or a direct current (DC) power to a power transmission pad 21 including a transmission coil via a power link. Additionally, the charging station 20 may be configured to communicate with an infrastructure management system or an infrastructure server that manages the power grid 30 or a power network via wired/wireless communications, and perform wireless communications with the EV 10. The wireless communications may be Bluetooth, ZigBee, cellular, wireless local area network (WLAN), or the like. For example, the charging station 20 may be located at various locations including a parking area attached to the a house, a parking area for charging an EV at a gas station, a parking area at a shopping center or a workplace.

A process of wirelessly charging the battery 12 of the EV 10 may begin with first disposing the power reception pad 11 of the EV 10 in an energy field generated by the power transmission pad 21, and coupling the reception coil and the transmission coil with each other. An electromotive force may be induced in the power reception pad 11 as a result of the interaction or coupling, and the battery 12 may be charged by the induced electromotive force.

The charging station 20 and the transmission pad 21 may be referred to as a ground assembly (GA) in whole or in part, where the GA may refer to the previously defined meaning. All or part of the internal components and the reception pad 11 of the EV 10 may be referred to as a vehicle assembly (VA), in which the VA may refer to the previously defined meaning. The power transmission pad or the power reception pad may be configured to be non-polarized or polarized.

When a pad is non-polarized, one pole is disposed in a center of the pad and an opposite pole is disposed in an external periphery. In particular, a flux may be formed to exit from the center of the pad and return to external boundaries of the pad. When a pad is polarized, a respective pole may be disposed at either end portion of the pad. In particular, a magnetic flux may be formed based on an orientation of the pad. In the present disclosure, the transmission pad 21 or the reception pad 11 may collectively be referred to as a "wireless charging pad".

Figure 2:
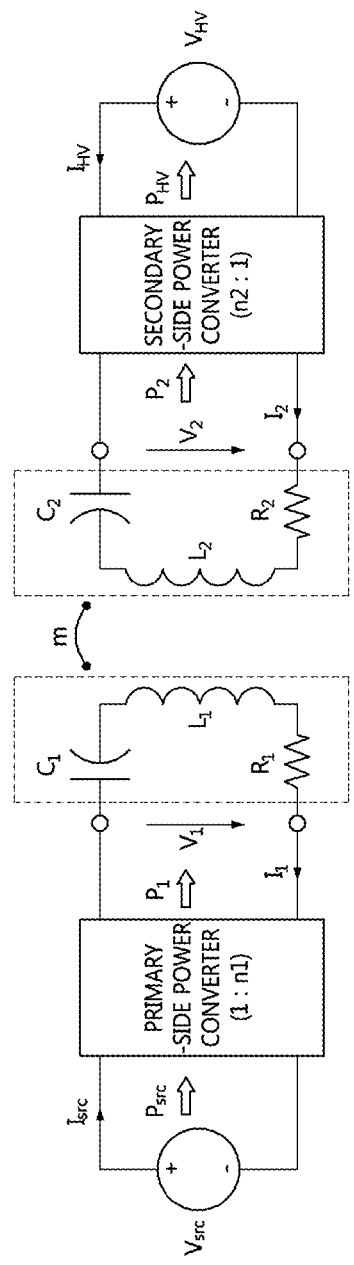
FIG. 2 is a conceptual diagram illustrating a WPT circuit according to exemplary embodiments of the present disclosure.

FIG. 2 is a conceptual diagram illustrating a WPT circuit according to exemplary embodiments of the present disclosure. As shown in FIG. 2, a schematic configuration of a circuit in which a WPT is performed in an EV WPT system is shown. The left side of FIG. 2 may be interpreted as expressing all or part of a power source $V_{src}$ (with current $I_{src}$) supplied from the power network, the charging station 20, and the transmission pad 21 in FIG. 1, and the right side of FIG. 2 may be interpreted as expressing all or part of the EV including the reception pad and the battery.

First, the left-side circuit of FIG. 2 may provide an output power $P_{src}$ that corresponds to the power source $V_{src}$ supplied from the power network to a primary-side power converter. The primary-side power converter may be configured to supply an output power $P_1$ converted from the output power $P_{src}$ with frequency-converting and AC-to-DC/DC-to-AC converting to generate an electromagnetic field at a desired operating frequency in a transmission coil $L_1$.

Specifically, the primary-side power converter may include an AC/DC converter configured to convert the power $P_{src}$ which is an AC power supplied from the power network into a DC power, and a low-frequency (LF) converter configured to convert the DC power into an AC power having an operating frequency suitable for wireless charging. For example, the operating frequency for wireless charging may be determined to be within about 79 to 90 kHz.

The power $P_1$ output from the primary-side power converter may be supplied again to a circuit including the transmission coil $L_1$, a first capacitor $C_1$ and a first resistor $R_1$. In particular, a capacitance of the first capacitor $C_1$ may be determined as a value to have an operating frequency suitable for charging together with the transmission coil $L_1$. The first resistor $R_1$ may represent a power loss occurred by the transmission coil $L_1$ and the first capacitor $C_1$. Electrical potential or voltage $V_1$ occurs across a first node (connected to the first capacitor $C_1$ of the circuit) and a second node (connected to the first resistor $R_1$ of the circuit), and a current $I_1$ flows between the second node and the primary-side power converter.

Further, the transmission coil $L_1$ may be made to have electromagnetic coupling, which is defined by a coupling coefficient m, with the reception coil $L_2$ so that a power $P_2$ is transmitted, or the power $P_2$ is induced in the reception coil $L_2$. Therefore, the meaning of power transfer in the present disclosure may be used together with the meaning of power induction. Still further, the power $P_2$ induced in or transferred to the reception coil $L_2$ may be provided to a secondary-side power converter. Particularly, a capacitance of a second capacitor $C_2$ may be determined as a value having an operating frequency suitable for wireless charging together with the reception coil $L_2$, and a second resistor $R_2$ may represent a power loss occurring by the reception coil $L_2$ and the second capacitor $C_2$. Electrical potential or voltage $V_2$ occurs across a third node (connected to the second resistor $R_2$ of the circuit) and a fourth node (connected to the second capacitor $C_2$ of the circuit), and a current $I_2$ flows between the secondary-side power converter and the third node.

The secondary-side power converter may include an AC-to-DC converter configured to convert the supplied power $P_2$ of a specific operating frequency to a DC power having a voltage level suitable for a battery $V_{HV}$ (with current $I_{HV}$) of the EV. The electric power $P_{HV}$ converted from the power $P_2$ supplied to the secondary-side power converter may be output, and the power $P_{HV}$ may be used for charging the battery $V_{HV}$ disposed in the EV.

The right side circuit of FIG. 2 may further include a switch for selectively connecting or disconnecting the reception coil $L_2$ with the battery $V_{HV}$. In particular, resonance frequencies of the transmission coil $L_1$ and the reception coil $L_2$ may be similar or identical to each other, and the reception coil $L_2$ may be positioned near the electromagnetic field generated by the transmission coil $L_1$. The circuit of FIG. 2 should be understood as an illustrative circuit for WPT in the EV WPT system used for exemplary embodiments of the present disclosure, and is not limited to the circuit illustrated in FIG. 2.

On the other hand, since the power loss may increase as the transmission coil $L_1$ and the reception coil $L_2$ are separated by a predetermined distance, the relative positions of the transmission coil $L_1$ and the reception coil $L_2$ may be set. The transmission coil $L_1$ may be included in the transmission pad 21 in FIG. 1, and the reception coil $L_2$ may be included in the reception pad 11 in FIG. 1. Additionally, the transmission coil may be referred to as a GA coil, and the reception coil may be referred to as a VA coil. Therefore, position alignment between the transmission pad and the reception pad or position alignment between the EV and the transmission pad will be described below with reference to the drawings.

Figure 3:
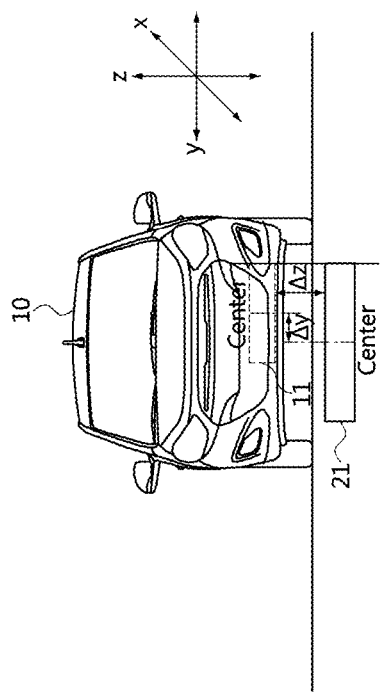
FIG. 3 is a conceptual diagram for explaining a concept of alignment in an EV WPT according to exemplary embodiments of the present disclosure.

FIG. 3 is a conceptual diagram for explaining a concept of alignment in an EV WPT according to exemplary embodiments of the present disclosure. As shown in FIG. 3, a method of aligning the power transmission pad 21 and the power reception pad 11 in the EV in FIG. 1 will be described. In particular, positional alignment may correspond to the alignment, which is the above-mentioned term, and thus may be defined as positional alignment between the GA and the VA, but is not limited to the alignment of the transmission pad and the reception pad. Although the transmission pad 21 is illustrated as positioned below a ground surface as shown in FIG. 3, the transmission pad 21 may also be positioned on the ground surface, or positioned to expose a top portion surface of the transmission pad 21 below the ground surface.

The reception pad 11 of the EV may be defined by different categories based on heights (defined in the z-direction) measured from the ground surface. For example, a class 1 for reception pads having a height of about 100-150 millimeters (mm) from the ground surface, a class 2 for reception pads having a height of about 140-210 mm, and a class 3 for reception pads having a height of about 170-250 mm may be defined. The reception pad may support a part of the above-described classes 1 to 3. For example, only the class 1 may be supported according to the type of the reception pad 11, or the class 1 and 2 may be supported according to the type of the reception pad 11. The height of the reception pad measured from the ground surface may correspond to the previously defined term "vehicle magnetic ground clearance."

Further, the position of the power transmission pad 21 in the height direction (i.e., defined in the z-direction) may be determined to be disposed between the maximum class and the minimum class supported by the power reception pad 11. For example, when the reception pad supports only the class 1 and 2, the position of the power transmission pad 21 may be determined between about 100 and 210 mm with respect to the power reception pad 11. For example, a distance $\Delta z$ may be measured between a top surface of the power transmission pad 21 and a bottom surface of the power reception pad 11.

In addition, a gap between the center of the power transmission pad 21 and the center of the power reception pad 11 may be determined to be disposed within the limits of the horizontal and vertical directions (defined in the x- and y-directions). For example, the gap (e.g., $\Delta y$) may be determined to be located within ±75 mm in the horizontal direction (defined in the (+y)-direction or in the right direction perpendicular to the vehicle direction), and within ±100 mm in the vertical direction (defined in the (−x)-direction or in a vehicle travelling direction). The relative positions of the power transmission pad 21 and the power reception pad 11 may be varied in accordance with experimental results, and the numerical values should be understood as exemplary.

Although the alignment between the pads is described on the assumption that each of the transmission pad 21 and the reception pad 11 includes a coil, more specifically, the alignment between the pads may refer to the alignment between the transmission coil (or GA coil) and the reception coil (or VA coil) which are respectively included in the transmission pad 21 and the reception pad 11.

Meanwhile, to maximize charging efficiency during wireless charging to an EV (EV wireless charging), low-frequency (LF) signals may be used for alignment between the primary coil (i.e., GA coil) and the secondary coil (i.e., VA coil). The LF signal is a digitally modulated magnetic field that operates in a low frequency ITU radio band. An LF sensor may operate at a fixed frequency within a frequency range of 19 kHz to 300 kHz.

Figure 8:
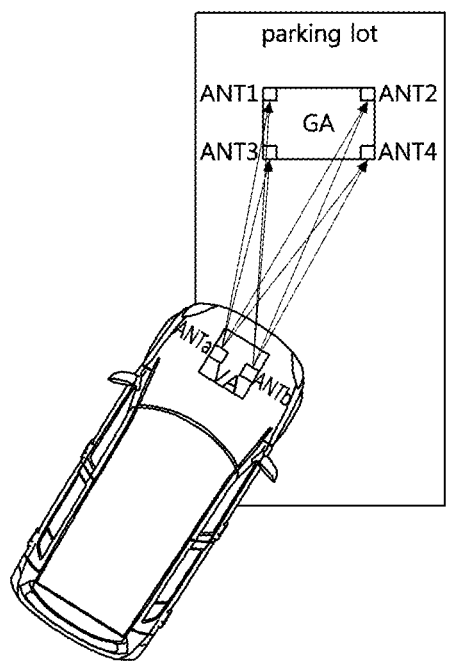
FIG. 8 is a conceptual diagram illustrating position alignment for WPT to which exemplary embodiments of the present disclosure are applied.

In addition, the magnetic field may be generated by at least two antennas located in the EV. The LF antennas in the EV may be located, for example, in the positions as shown in FIG. 8 below, without being limited by the exemplary embodiment. Additionally, the primary side device may include at least two magnetic sensors, wherein sensing elements of the magnetic sensor may be preferably arranged symmetrically. The magnetic sensors may be configured to measure a strength of the magnetic field in the x, y, and z directions.

Meanwhile, position alignment techniques using autonomous (or, automatic) parking or remote parking are being studied. Additionally, according to ISO 15118-8 that is an EV charging communication standard document, when wireless communication for charging an EV is used, communication between an electric vehicle communication controller (EVCC) and a supply equipment communication controller (SECC) conforms to the IEEE 802.11-2012. A required range of a distance between the EVCC and the SECC for a communication channel considered in the wireless communication is 5 m to 30 m for discovery, 10 cm to 5 m for fine positioning (fine alignment), and 5 cm to 5 m for charge control.

Particularly, the discovery is a step in which an EV searches for a charging pad, and the EVCC enters a communication region of at least one SECC and connects with an appropriate SECC. The fine positioning may refer to alignment between primary and EV devices (i.e., coils) for efficient power transfer via WPT, and alignment between connectors of the EV and an EVSE for power transfer when an automatic connection for conductive charging is employed. The charge control may be in form of, for example, a power request from the EV to the EVSE.

Figure 4:
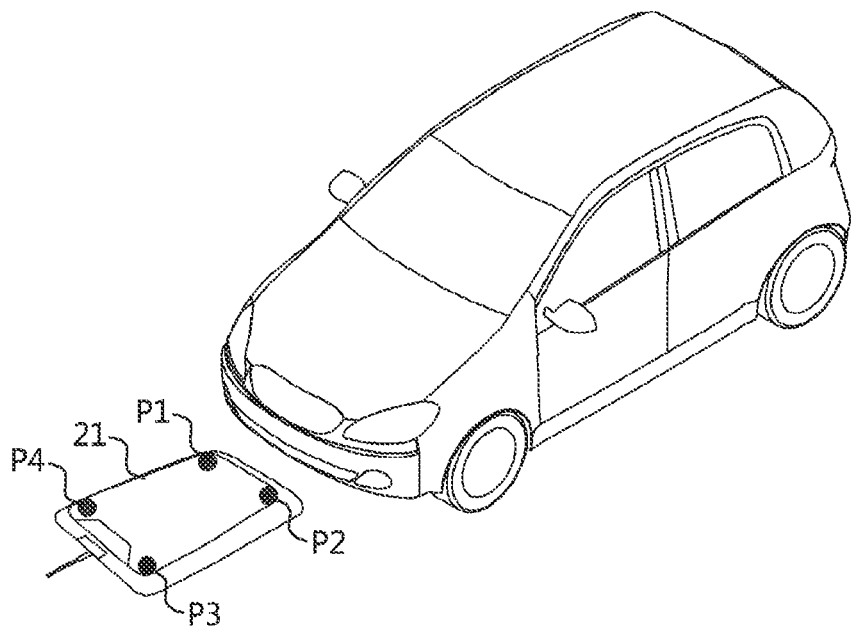
FIG. 4 is a diagram illustrating a charging pad and an electric vehicle according to an exemplary embodiment of the present disclosure.

FIG. 4 is a diagram illustrating a charging pad and an electric vehicle according to an exemplary embodiment of the present disclosure.

The present disclosure relates to a method for determining a position of a wireless power transmitter relative to a wireless power receiver. The distance or direction between the wireless power transmitter and the wireless power receiver may be determined by detecting magnetic fields generated at the wireless power transmitter or the wireless power receiver, and thus may determine the relative position between the receiver and the transmitter.

As shown in FIG. 4, a technique for determining whether the vehicle is in a correct position for WPT by using four LF antennas P1, P2, P3, and P4 mounted on the wireless power transmitter (i.e., transmission pad 21), and two LF antennas V1 and V2 mounted on the wireless power receiver (i.e., reception pad) has been being discussed.

Figure 5:
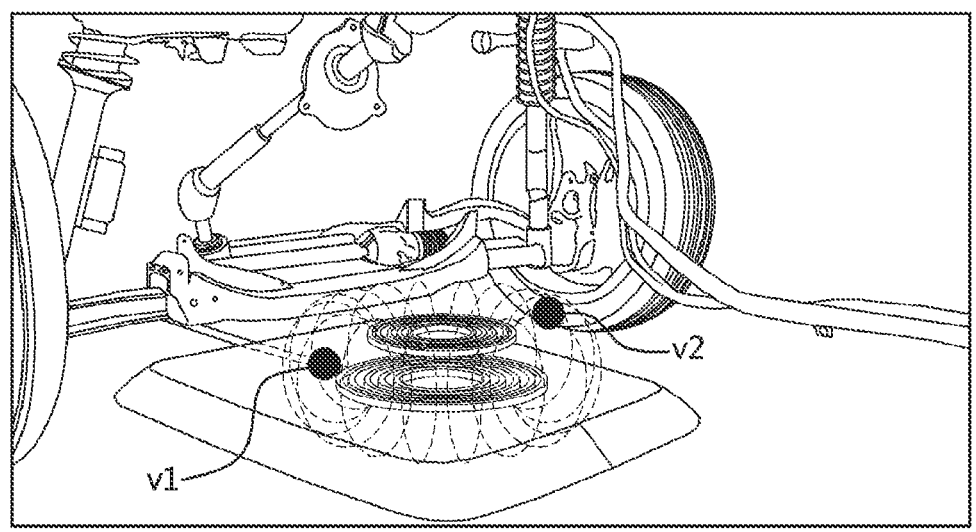
FIG. 5 is a diagram illustrating a flow of electric power in WPT according to an exemplary embodiment of the present disclosure.

FIG. 5 is a diagram illustrating a flow of electric power in WPT according to an exemplary embodiment of the present disclosure.

As shown in FIG. 5, it can be seen that the electric power is transferred from the charging pad to the EV. However, this is merely a power flow shown virtually for visualization purposes, and the illustrated contents do not limit exemplary embodiments of the present disclosure.

In addition, as shown in FIG. 5, the LF antennas V1 and V2 of the EV according to the exemplary embodiment of the present disclosure may be symmetrically positioned at positions corresponding to left and right, or top and bottom of the charging pad.

Figure 6:
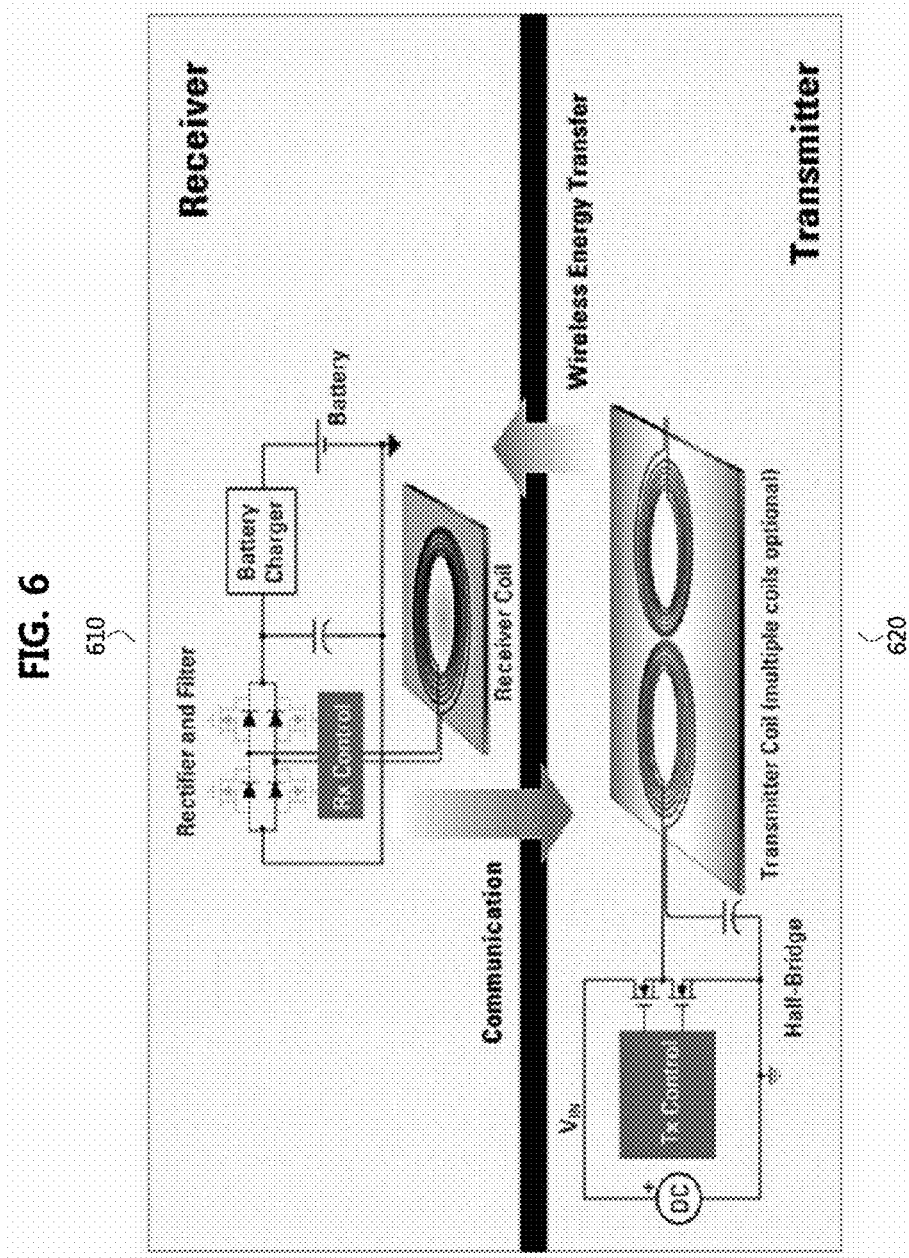
FIG. 6 is a diagram illustrating circuits of a power transmitter and a power receiver for performing wireless power transfer.

FIG. 6 is a diagram illustrating circuits of a power transmitter and a power receiver for performing wireless power transfer.

As shown in FIG. 6, a wireless power receiver 610 may include a receiver coil, a battery, a battery charger, a rectifier and filter, and a receive controller (denoted as 'Rx Control'). A wireless transmitter 620 may include a transmitter coil, a DC voltage supply, a half-bridge circuit, and a transmit controller (denoted as 'Tx Control').

Figure 7:
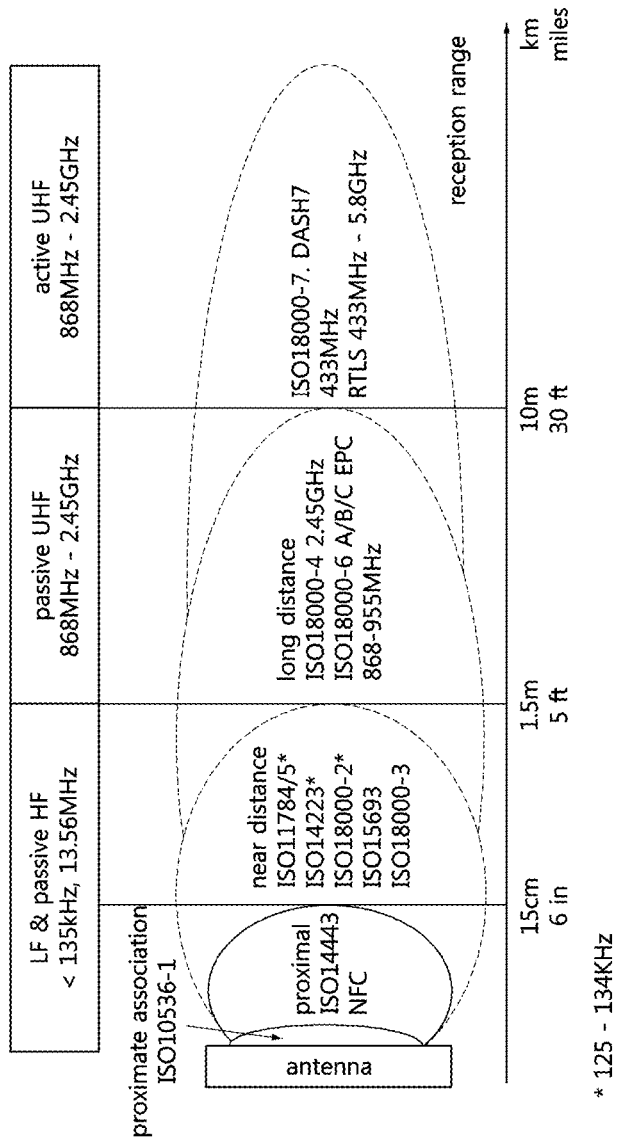
FIG. 7 is a diagram illustrating reception ranges for signals according to various frequencies.

FIG. 7 is a diagram illustrating reception ranges for signals according to various frequencies.

As shown in FIG. 7, when using an LF tag and a passive HF tag, they may be readable from a proximal or near distance. In addition, when using a passive UHF tag, it may be readable from a long distance. When using an active UHF tag, it may be readable at a relatively longer distance according to capability of the active tag.

However, due to the characteristics of the LF sensor, when the receiver and the transmitter are closer than a predetermined level, there may be a limit of not detecting a correct distance due to signal saturation. Accordingly, the present disclosure is directed to providing a method for resolving the limitation of signal saturation in position alignment using the LF signal.

FIG. 8 is a conceptual diagram illustrating position alignment for WPT to which exemplary embodiments of the present disclosure are applied.

As shown in FIG. 8, a position alignment method, which is a method for maximizing and/or optimizing the wireless charging efficiency by aligning a primary coil of a GA to a secondary coil of a VA, may be performed based on measurement of magnetic fields between four antennas ANT1, ANT2, ANT3 and ANT4 in the GA side and two antennas ANTa and ANTb in the VA side.

In particular, the VA may include two antennas, and the two antennas may be disposed one by one (e.g., sequentially) in the left and right regions of the VA. The left and right regions may refer to regions divided into two halves of the VA, and may be left and right symmetrically separated regions. When the VA has a rectangular structure, the two antennas may be disposed at the center of the left side and the center of the right side respectively of the rectangular structure, but the structure is not limited to a rectangle because it may be changed according to a design selection.

Additionally, the two antennas may be disposed in a specific portion of the vehicle as connected with the VA, in which case they may be disposed one by one in the left and right regions of the specific portion of the vehicle. The left region and the right region of the specific portion of the vehicle may refer to symmetrically separated regions in the specific portion of the vehicle. Alternatively, instead of the left and right regions of the specific portion of the VA or the vehicle, a front region and a rear region of the specific portion of the VA or the vehicle may be used, but are not limited thereto. In other words, two regions that are symmetrically separated may be generally used. Hereinafter, it will be assumed that the antennas are disposed in the VA.

The VA or a VA controller may control the antennas and calculate position difference information between the VA and the GA.

The GA may include four antennas, and the four antennas may be disposed in a first region, a second region, a third region, and a fourth region of the GA, respectively, and the first, second, third, and fourth regions may refer to a upper left region, a upper right region, a lower left region, and a lower right region of the GA, respectively. However, exemplary embodiments of the present disclosure are not limited thereto, and may refer to regions divided from the GA into quadrants to have the same size. When the GA has a rectangular structure, the four antennas may be disposed at each corner of the rectangular structure, but the structure is not limited to a rectangle because it may be changed according to a design selection. Additionally, the GA or a GA controller may also calculate magnetic field measurement values based on magnetic fields detected by the four antennas.

Herein, the antenna included in the VA and/or GA may refer to a loop antenna or may refer to a ferrite rod antenna, but is not limited thereto. The ferrite rod antenna can be used in vehicles, portable radios, and aircraft due to its reduced size, have almost no reflection, and allow for good range control with a gentle reduction in the field strength. Also, the ferrite rod antenna may have a high penetration rate, require a low quiescent current according to a resonant frequency input stage, and may be less susceptible to detuning compared to high frequencies. However, since the ferrite rod antenna has a very high Q factor, it is possible to filter some of required signal modulation.

The ferrite rod antenna may refer to an antenna using an LF. A ferrite rod loop antenna may be thought of as a special case of conventional air-core loop antennas. The air-core loop antenna is synonymous with a solenoid. Thus, a magnetic field in the solenoid may be expressed on the basis of Ampere's law. However, since a medium inside a coil in the solenoid is air, if the inside medium is a ferrite rod, the ferrite rod, the medium inside the coil, should be reflected. In addition, considering the number of turns of the coil, the radius of the coil, the length of the coil, etc., the final magnetic field of the LF antenna (i.e., ferrite rod loop antenna) may be expressed by Equation 1 below.

$$B = \frac{\mu_o I N a^2}{2(a^2+r^2)^{3/2}} \approx \frac{\mu_o I N a^2}{2r^3} [\text{Tesla}] \quad \text{[Equation 1]}$$

where $\mu_o$ = magnetic permeability $I$ = Current[$A$]

$N$ = Number of turns $a$ = radius of coil[$m$]

$r$ = distance from coil[$m$]

Meanwhile, the LF may refer to an LF band using a band of 30 to 300 kHz among 12 frequency ranges classified by International Telecommunication Union (ITU). Table 1 below shows the frequency ranges divided into 12 ranges in the ITU.

TABLE 1

|   | Abbreviation | Frequency range | Wave length range |
|---|---|---|---|
| 1 | ELF | 3~30 Hz | 100,000~10,000 km |
| 2 | SLF | 30~300 Hz | 10,000~1000 km |
| 3 | ULF | 300~3000 Hz | 1000~100 km |
| 4 | VLF | 3~30 kHz | 100~10 km |
| 5 | LF | 30~300 kHz | 10~1 km |
| 6 | MF | 300~3000 kHz | 1000~100 m |
| 7 | HF | 3~30 MHz | 100~10 m |
| 8 | VHF | 30~300 MHz | 10~1 m |
| 9 | UHF | 300~3000 MHz | 1~0.1 m |
| 10 | SHF | 3~30 GHz | 100~10 mm |
| 11 | EHF | 30~300 GHz | 10~1 mm |
| 12 | THF | 300~3000 GHz | 1~0.1 mm |

Figure 9:
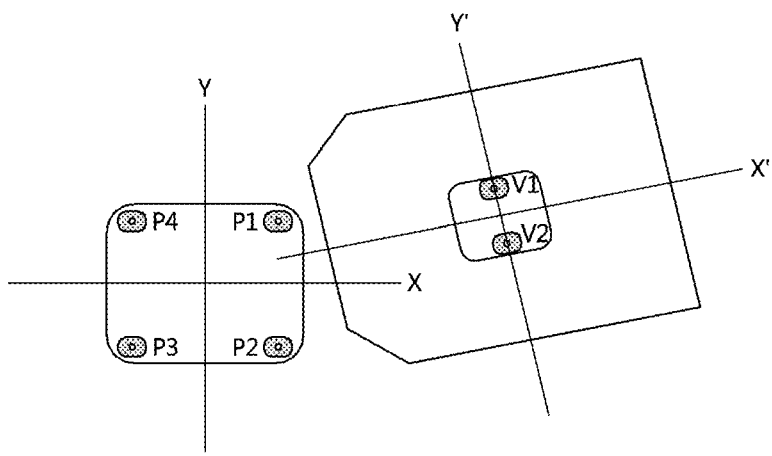
FIG. 9 is a diagram illustrating an example of LF antenna alignment between a transmission pad and a reception pad.

FIG. 9 is a diagram illustrating an example of LF antenna alignment between a transmission pad and a reception pad.

As shown in FIG. 9, a (x, y) coordinate system represents a coordinate system for a transmission pad of a power supply side apparatus, and a (x', y') coordinate system represents a coordinate system of a vehicle (or, reception pad). The antennas of the power supply side apparatus (or, transmission pad) are represented by P1, P2, P3 and P4, and are arranged symmetrically in the upper left, upper right, lower left and lower right region of the transmission pad. The antennas of the vehicle side are represented by V1 and V2, and are symmetrically located around the magnetic field structure of the reception pad.

In consideration of such the arrangement, the vehicle side apparatus and the power supply side apparatus may perform position alignment using the LF signals.

Figure 10:
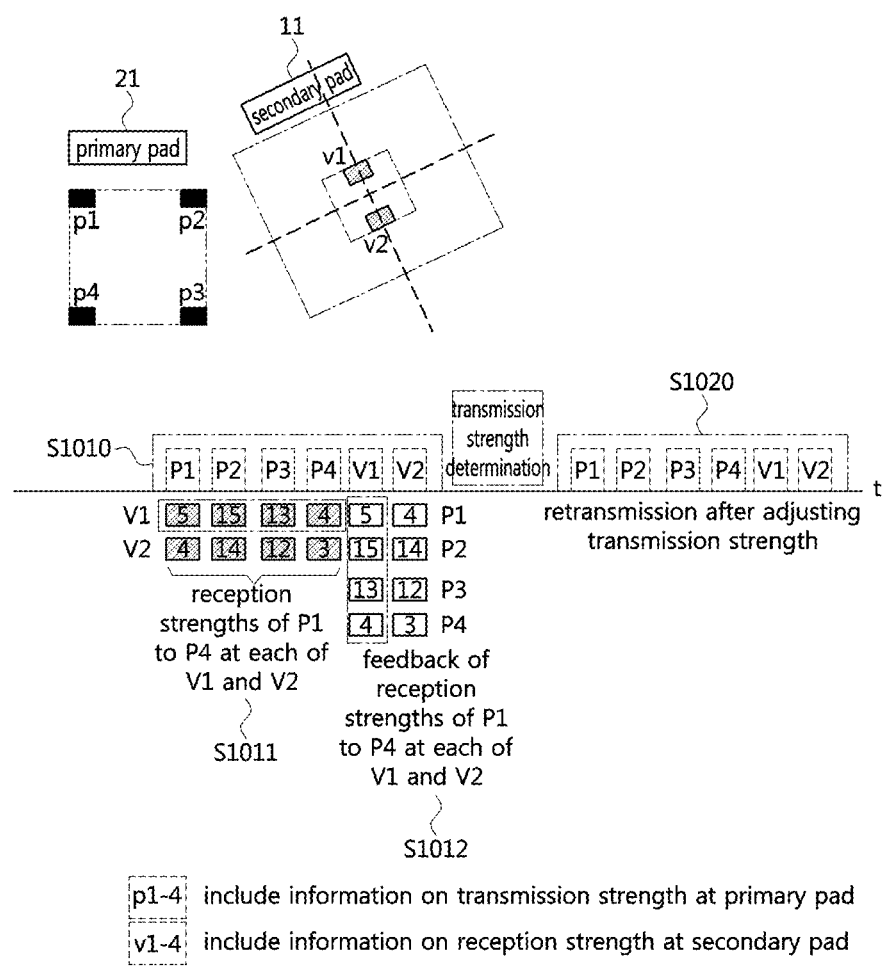
FIG. 10 is a diagram for describing a method of determining a transmission strength according to an exemplary embodiment of the present disclosure.

FIG. 10 is a diagram for describing a method of determining a transmission strength according to an exemplary embodiment of the present disclosure.

The present disclosure relates to a method of controlling alignment between a transmission pad and a reception pad for WPT by using LF signal strength control and communication between the pads. More specifically, an exemplary embodiment of the present disclosure may control a transmission strength at the transmission pad and determine an expected position of the vehicle by defining the characteristics of a transmission strength and a transmission time at the transmission pad (i.e., primary pad 21) and a measured reception strength and a reception time at the reception pad (i.e., secondary pad 11).

The primary pad 21 may have LF spots P1 to P4 at positions characterizing the size of the primary pad 21, and the secondary pad 11 may have LF spots V1 to V2 at positions characterizing the size of the secondary pad 11. Here, the LF spot may be an LF antenna, an LF transceiver, or an LF sensor.

The LF spots on the primary pad may perform transmission of LF signals periodically for synchronizing wireless communications for position alignment. The LF spots on the secondary pad may respond immediately upon receipt of the LF signals from the primary pad. The primary pad may set a time point at which the response of the secondary pad is received as a synchronization reference time. Alternatively, both of the pads may perform synchronization using a reference time obtained using GPS.

After the synchronization, as shown in FIG. 10, each of the primary pad and the secondary pad may perform transmission at a transmission time determined according to a time division order (S1010 and S1020). For example, at the time of transmission of the primary pad, the secondary pad may be in a reception standby state (S1011), and at the time of transmission of the secondary pad, the primary pad may be in a reception standby state (S1012).

As shown in FIG. 10, each of the four LF spots P1 to P4 disposed on the primary pad 21 may transmit an LF signal at a time point allocated in the time division manner. In the exemplary embodiment of FIG. 10, P1, P2, P3, and P4 may sequentially transmit LF signals, and each of the LF spots V1 and V2 disposed on the secondary pad 11 may measure the LF signals transmitted from the primary pad at each time point (S1011). For example, a signal strength (e.g. 5) of P1, a signal strength (e.g., 15) of P2, a signal strength (e.g., 13) of P3, and a signal strength (e.g., 4) of P4, which are measured by the LF spot V1, may be different from each other. The LF spot may also measure the signal strengths of $P_1$, $P_2$, $P_3$, and $P_4$ at its position.

The secondary pad 11 measuring the reception strengths of the LF signals transmitted from the primary pad may transmit information on the reception strengths measured at the respective time points associated with $P_1$, $P_2$, $P_3$, and $P_4$ to the primary pad (S1012). Upon receiving the information on the measured reception strengths from the secondary pad, the primary pad may adjust the transmission strength based on the magnitude of the measured reception strengths, and transmit the LF signals using the adjusted transmission strength (S1020).

Figure 11:
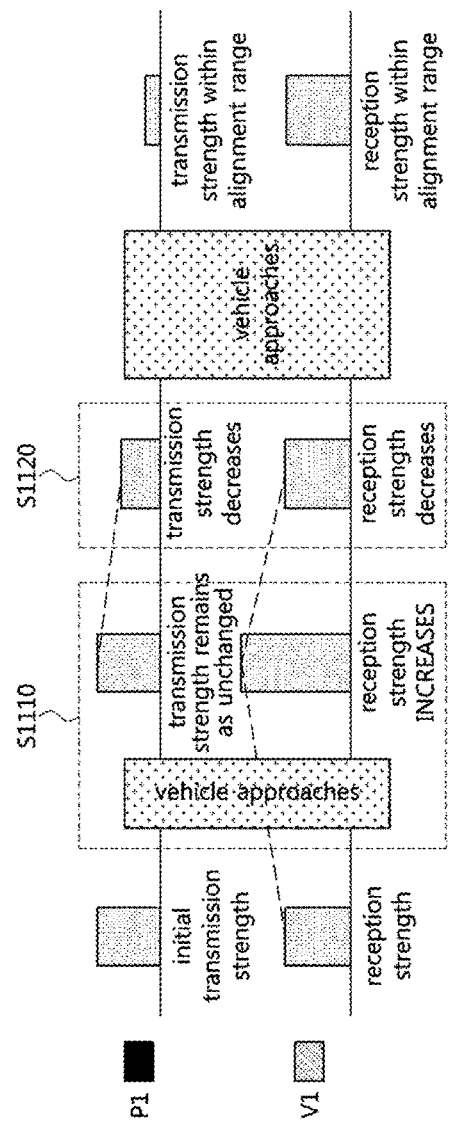
FIG. 11 is a diagram illustrating variation of transmission strength and measured reception strength according to a position of a vehicle according to an exemplary embodiment of the present disclosure.

FIG. 11 is a diagram illustrating variation of transmission strength and measured reception strength according to a position of a vehicle according to an exemplary embodiment of the present disclosure.

When the measured reception strengths at the secondary pad for the LF signals transmitted from the primary pad are fed back to the primary pad, the primary pad may compare the transmission strength of the corresponding LF signals with the measured reception strengths at the secondary pad. A processor of the primary pad may estimate a variation in the distance between the primary pad and the secondary pad based on a result of the comparison.

The above process may be repeated, and as the primary pad and the secondary pad get closer to each other, the reception strengths measured by the secondary pad may increase (S1110). The processor of the primary pad identifying that the measured strength has been increased to a larger value may transmit the LF signals by adjusting the transmission strength to a smaller size than before (S1120), thereby preventing signal saturation when the primary and secondary pads are close to each other.

Figure 12B:
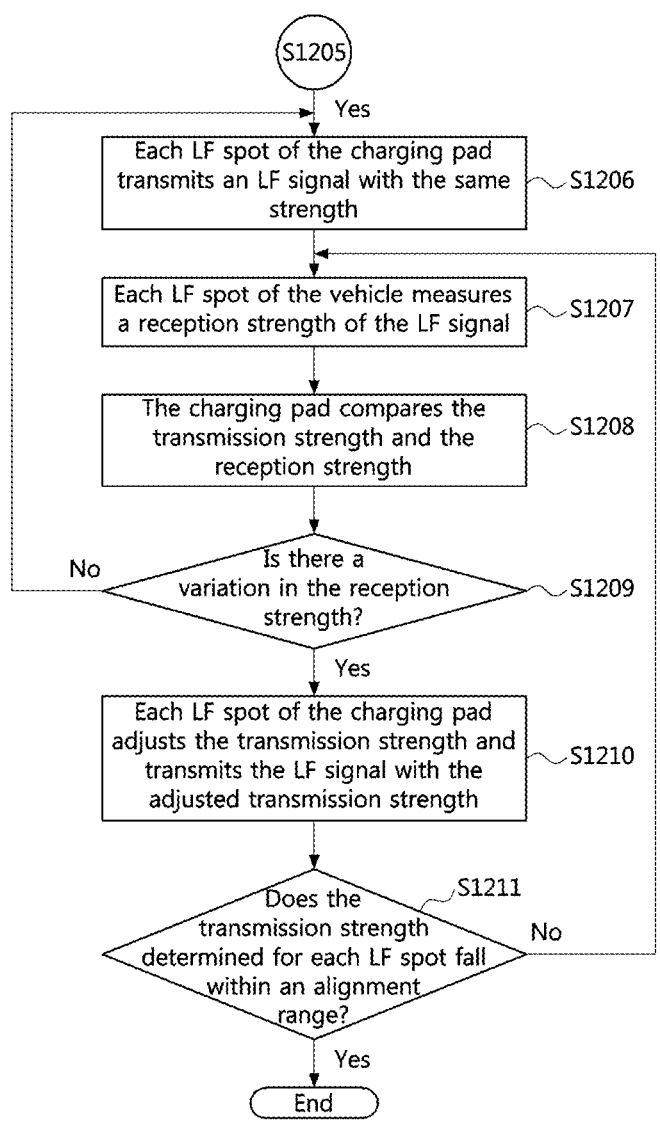

FIGS. 12A and 12B are flowcharts illustrating a position measurement method according to an exemplary embodiment of the present disclosure.

The position measurement method according to an exemplary embodiment of the present disclosure, which is shown in FIGS. 12A and 12B, may be performed by the vehicle or a position alignment apparatus included in the vehicle, and the charging pad, or a position alignment apparatus or a position measurement apparatus included in the charging pad. Here, the charging pad may mean the primary pad or the transmission pad.

When the vehicle enters a charging station and is positioned around the charging pad (S1201), a first synchronization signal may be sequentially transmitted by the LF spots P1 to P4 of the charging pad (S1202). In this case, the first synchronization signal transmitted by the LF spot of the charging pad may be an LF signal for starting synchronization among LF spots and include a preamble, an identifier (ID) of each spot, and location information of each spot.

In this case, the vehicle may receive the first synchronization signal transmitted from all the LF spots of the charging pad (S1203), and may determine a first time point at which the first synchronization signal including the location information having one spot ID is received as a synchronization start time point.

When the vehicle receives the first synchronization signal from the LF spot of the charging pad, the vehicle may transmit a second synchronization signal to the charging pad in response to the first synchronization signal (S1204). In this case, the LF spots V1 and V2 of the vehicle (e.g., the secondary pad in the vehicle) may sequentially transmit LF data.

Upon receipt of the second synchronization signal (S1205), each of the LF spots P1 to P4 of the charging pad receiving the LF data transmitted by the vehicle may identify whether synchronization-related information promised to each other is received identically, and identify whether the contents of the data received from the LF spots V1 to V2 match to each other.

When the synchronization is completed, each LF spot of the charging pad may transmit an LF signal with the same strength (S1206). The vehicle receiving the LF signal may provide the charging pad with information on the strength of the received LF signal (S1207).

The charging pad may compare the transmission strength of the LF signal transmitted by the charging pad and the reception strength of the corresponding LF signal, which is informed from the vehicle, by calculating a difference (i.e., path loss) therebetween (S1208).

The charging pad may identify whether the reception strength received from the vehicle has increased as the two pads approaches (S1209), and may adjust the transmission strength at each point of the charging pad to transmit the LF signal (S1210). That is, the charging pad may adjust the transmission strength to be used in the next transmission of the LF signals to be lower than in the previous transmission to match the increased reception strength to a standard strength.

As such, the charging pad may repeatedly adjust the transmission strength of the LF signals as the vehicle approaches to the charging pad, so that the reception strength is maintained as a constant value.

The charging pad may repeatedly perform transmission and adjustment of the transmission strength of the LF signals until the transmission strength determined for each LF spot falls within an alignment range (S1211).

The charging pad may convert the decrease in the transmission strength of the primary pad into a distance, and reflect the converted distance to an estimated distance between the charging pad and the vehicle. The charging pad may determine whether the transmission strength falls within the alignment range based on the estimated distance between the vehicle and the charging pad.

Figure 13:
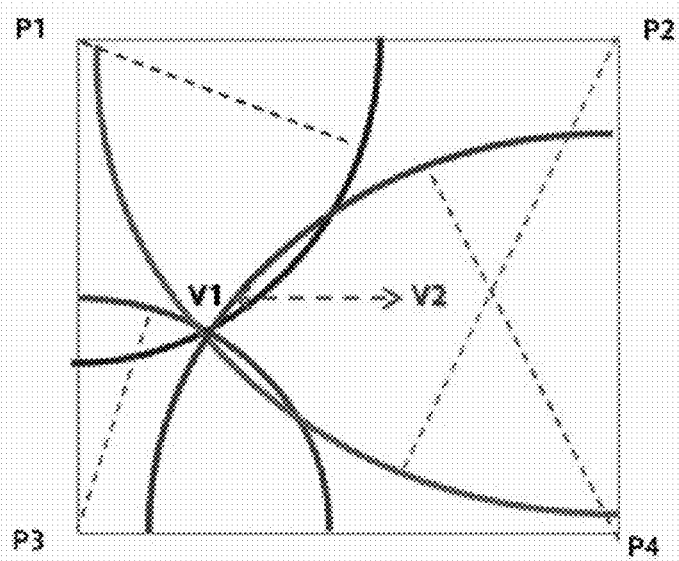
FIG. 13 is a conceptual diagram illustrating a method of determining whether a vehicle is positioned within an alignment range according to an exemplary embodiment of the present disclosure.

FIG. 13 is a conceptual diagram illustrating a method of determining whether a vehicle is positioned within an alignment range according to an exemplary embodiment of the present disclosure.

In order to determine whether the vehicle is positioned within the alignment range, the strengths of the LF signals transmitted by the LF spots P1 to P4 of the charging pad and received at the LF spot V1 may be measured. Then, the charging pad may define a charging pad region by setting the positions of the LF spots P1 to P4 to be vertexes of the charging pad region. That is, as shown in FIG. 13, the charging pad region may be defined as a rectangle having the vertexes corresponding to the LF spots P1 to P4. When the charging pad region is defined, four circles, each of which is centered at each vertex of the charging pad region and has a radius corresponding to each reception strength at the LF spot V1, may be configured. In this case, a point where the four circles intersect may be determined as the position of the LF spot V1.

Additionally, the strengths of the LF signals transmitted by the LF spots P1 to P4 of the charging pad and received at the LF spot V2 may be measured. Then, four circles, each of which is centered at each vertex of the charging pad region and has a radius corresponding to each reception strength at the LF spot V2, may be configured. In this case, a point where the four circles intersect may be determined as the position of the LF spot V2.

Then, as shown in FIG. 13, by determining whether the position of V1 and the position of V2 belong to the charging pad region, it may be determined whether the adjusted transmission strength falls within an alignment range. That is, when the positions of V1 and V2 determined as described above belong to the region defined by the four LF spots of the transmission pad, it may be determined that the vehicle is located within the alignment range with the transmission pad.

Figure 14:
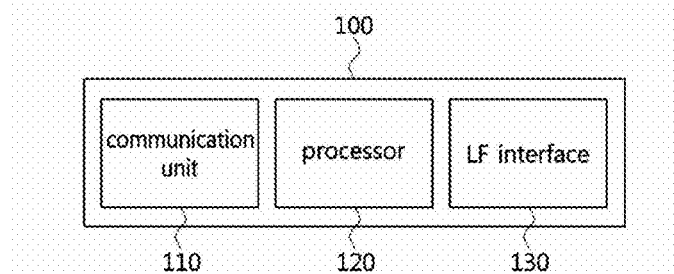
FIG. 14 is a block diagram illustrating a position measurement apparatus according to an exemplary embodiment of the present disclosure.

FIG. 14 is a block diagram illustrating a position measurement apparatus according to an exemplary embodiment of the present disclosure.

As shown in FIG. 14, a position measurement apparatus 100 according to an exemplary embodiment of the present disclosure may include a communication unit 110, a processor 120, and an LF interface 130.

The position measurement apparatus 100 may include a GA or may be a GA itself. The components of the position measurement apparatus 100 are not limited to their names, but may be defined by their functions. The communication unit 110 may include a communication module capable of communicating with the vehicle. Here, the communication module may include a communication module capable of performing WIFI communications, and may also include a communication module capable of performing 3G communications and 4G communications, but is not limited thereto.

In addition, the communication unit 110 may be connected to the vehicle for alignment between GA and VA, and may transmit the measurement result of the received signals configured according to the present disclosure to the vehicle.

The processor 120 may calculate the measurement result based on magnetic fields detected through the LF interfaces 130. Here, the magnetic fields may exist for the respective LF spots connected to the LF interface 130. The processor 120 may also provide the measurement result to the communication unit 110 to transmit it to the counterpart apparatus.

The LF interface 130 may be connected to a plurality of LF spots (e.g., LF antennas, LF transceivers, or LF sensors), for example, four LF spots located in the GA, and may acquire information on the LF magnetic fields detected by the four LF spots. The LF interface 130 may provide the processor 120 with the information on the magnetic fields.

Additionally, the position measurement apparatus 100 according to an exemplary embodiment of the present disclosure may include a processor and a memory storing at least one instruction executable by the processor. Here, the processor may execute the at least one instruction stored in the memory, and may be a central processing unit (CPU), a graphics processing unit (GPU), or a dedicated processor on which the methods according to the present disclosure are performed. The memory may be comprised of a volatile storage medium and/or a nonvolatile storage medium, and may be comprised of a read only memory (ROM) and/or a random access memory (RAM).

The at least one instruction may configure the processor to perform synchronization with a vehicle entering a vicinity of the charging pad; transmit LF signals having a same strength through a plurality of LF spots of the charging pad; receive information on reception strengths of the LF signals from the vehicle; adjust a transmission strength for the plurality of LF spots according to the information on reception strengths received from the vehicle; and transmit the LF signals according to the adjusted transmission strength.

Additionally, the at least one instruction may further configure the processor to determine whether the adjusted transmission strength falls within an alignment range between the vehicle and the charging pad. The processor may repeatedly perform the adjusting of the transmission strength and the transmitting of the LF signals until the adjusted transmission strength is determined to fall within the alignment range.

Additionally, in the performing of the synchronization, the at least one instruction may further configure the processor to transmit a first synchronization signal to the vehicle through the plurality of LF spots of the charging pad; and detect a second synchronization signal transmitted by the vehicle.

Additionally, in the adjusting of the transmission strength, the at least one instruction may further configure the processor to reduce the transmission strength for the plurality of LF spots when the reception strengths of the LF signals informed from the vehicle are increased as compared to previous reception strengths.

Additionally, in the adjusting of the transmission strength, the LF signals may be transmitted by the plurality of LF spots at different time points, respectively.

Additionally, in the determining of whether the adjusted transmission strength falls within the alignment range, the at least one instruction may further configure the processor to define a charging pad region having vertexes corresponding positions of the plurality of LF spots of the charging pad; and perform the determining using the defined charging pad region and the reception strengths at a plurality of LF spots of the vehicle.

Additionally, in the determining of whether the adjusted transmission intensity falls within the alignment range, the at least one instruction may further configure the processor to configure a plurality of circles each of which is centered at each vertex of the charging pad region and has a radius corresponding to each reception strength at a first LF spot of the vehicle; determine a point at which the plurality of circles intersect as a position of the first LF spot; and determine that the vehicle falls within the alignment range when the position of the first LF spot is within the charging pad region.

Each of the LF signals transmitted by the plurality of LF spots may include a preamble, an identifier of each LF spot, and position information of each LF spot.

While some aspects of the present disclosure have been described in the context of an apparatus, the present disclosure may also represent a description according to a corresponding method, wherein the block or apparatus corresponds to a method step or a feature of the method step. Similarly, aspects described in the context of a method may also be represented by features of the corresponding block or item or corresponding device. Some or all of the method steps may be performed by (or using) a hardware device such as, for example, a microprocessor, a programmable computer, or an electronic circuit. In various exemplary embodiments, one or more of the most important method steps may be performed by such an apparatus.

In exemplary embodiments, a programmable logic device (e.g., a field programmable gate array (FPGA)) may be used to perform some or all of the functions of the methods described herein. In addition, the FPGA may operate in conjunction with a microprocessor to perform one of the methods described herein. Generally, the methods are preferably performed by some hardware device.

The foregoing description has been directed to exemplary embodiments of the present disclosure. It will be apparent, however, that other variations, substitutions and modifications may be made to the described exemplary embodiments, with the attainment of some or all of their advantages. Accordingly, this description is to be taken only by way of example and not to otherwise limit the scope of the exemplary embodiments herein. Therefore, it is the object of the appended claims to cover all such variations and modifications as come within the true spirit and scope of the exemplary embodiments herein.

The invention claimed is:

1. A position measurement method for position alignment with a vehicle, performed by a charging pad, the position measurement method comprising:
performing synchronization with a vehicle entering a vicinity of the charging pad;
transmitting low frequency (LF) signals having a same strength through a plurality of LF spots of the charging pad;
receiving information on reception strengths of the LF signals from the vehicle;
adjusting a transmission strength for the plurality of LF spots according to the information on reception strengths received from the vehicle; and
transmitting the LF signals according to the adjusted transmission strength.

2. The position measurement method according to claim 1, further comprising determining whether the adjusted transmission strength falls within an alignment range between the vehicle and the charging pad, wherein the adjusting of the transmission strength and the transmitting of the LF signals are repeated until the adjusted transmission strength is determined to fall within the alignment range.

3. The position measurement method according to claim 1, wherein the performing of the synchronization further comprises:
transmitting a first synchronization signal to the vehicle through the plurality of LF spots of the charging pad; and
detecting a second synchronization signal transmitted by the vehicle.

4. The position measurement method according to claim 1, wherein the adjusting of the transmission strength further comprises reducing the transmission strength for the plurality of LF spots when the reception strengths of the LF signals informed from the vehicle are increased as compared to previous reception strengths.

5. The position measurement method according to claim 1, wherein in the adjusting of the transmission strength, the LF signals are transmitted by the plurality of LF spots at different time points, respectively.

6. The position measurement method according to claim 2, wherein the determining of whether the adjusted transmission strength falls within the alignment range further comprises:

defining a charging pad region having vertexes corresponding positions of the plurality of LF spots of the charging pad; and
performing the determining using the defined charging pad region and the reception strengths at a plurality of LF spots of the vehicle.

7. The position measurement method according to claim 6, wherein the determining of whether the adjusted transmission intensity falls within the alignment range further comprises:
configuring a plurality of circles each of which is centered at each vertex of the charging pad region and has a radius corresponding to each reception strength at a first LF spot of the vehicle;
determining a point at which the plurality of circles intersect as a position of the first LF spot; and
determining that the vehicle falls within the alignment range when the position of the first LF spot is within the charging pad region.

8. The position measurement method according to claim 1, wherein each of the LF signals transmitted by the plurality of LF spots includes a preamble, an identifier of each LF spot, and position information of each LF spot.

9. A position measurement apparatus for measuring a relative position between a vehicle and a charging pad, the position measurement apparatus comprising a processor and a memory storing at least one instruction executable by the processor, wherein when the at least one instruction executed by the processor, the at least one instruction configures the processor to:
perform synchronization with a vehicle entering a vicinity of the charging pad;
transmit low frequency (LF) signals having a same strength through a plurality of LF spots of the charging pad;
receive information on reception strengths of the LF signals from the vehicle;
adjust a transmission strength for the plurality of LF spots according to the information on reception strengths received from the vehicle; and
transmit the LF signals according to the adjusted transmission strength.

10. The position measurement apparatus according to claim 9, wherein the at least one instruction further configures the processor to determine whether the adjusted transmission strength falls within an alignment range between the vehicle and the charging pad, wherein the adjusting of the transmission strength and the transmitting of the LF signals are repeated until the adjusted transmission strength is determined to fall within the alignment range.

11. The position measurement apparatus according to claim 9, wherein in the performing of the synchronization, the at least one instruction further configures the processor to transmit a first synchronization signal to the vehicle through the plurality of LF spots of the charging pad; and detect a second synchronization signal transmitted by the vehicle.

12. The position measurement apparatus according to claim 9, wherein in the adjusting of the transmission strength, the at least one instruction further configures the processor to reduce the transmission strength for the plurality of LF spots when the reception strengths of the LF signals informed from the vehicle are increased as compared to previous reception strengths.

13. The position measurement apparatus according to claim 9, wherein in the adjusting of the transmission strength, the LF signals are transmitted by the plurality of LF spots at different time points, respectively.

14. The position measurement apparatus according to claim 10, wherein in the determining of whether the adjusted transmission strength falls within the alignment range, the at least one instruction further configures the processor to define a charging pad region having vertexes corresponding positions of the plurality of LF spots of the charging pad; and perform the determining using the defined charging pad region and the reception strengths at a plurality of LF spots of the vehicle.

15. The position measurement apparatus according to claim 14, wherein in the determining of whether the adjusted transmission intensity falls within the alignment range, the at least one instruction further configures the processor to:
- configure a plurality of circles each of which is centered at each vertex of the charging pad region and has a radius corresponding to each reception strength at a first LF spot of the vehicle;
- determine a point at which the plurality of circles intersect as a position of the first LF spot; and
- determine that the vehicle falls within the alignment range when the position of the first LF spot is within the charging pad region.

16. The position measurement apparatus according to claim 9, wherein each of the LF signals transmitted by the plurality of LF spots includes a preamble, an identifier of each LF spot, and position information of each LF spot.

* * * * *